United States Patent
Ichiyama

(10) Patent No.: US 6,250,808 B1
(45) Date of Patent: Jun. 26, 2001

(54) MOTOR HAVING A PLURALITY OF DYNAMIC PRESSURE BEARINGS

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/441,884

(22) Filed: Nov. 17, 1999

(30) Foreign Application Priority Data

| Nov. 20, 1998 | (JP) | 10-331669 |
| Dec. 17, 1998 | (JP) | 10-358647 |
| May 27, 1999 | (JP) | 11-147537 |

(51) Int. Cl.$^7$ .................................................. F16C 32/06
(52) U.S. Cl. ............................ 384/100; 384/107; 310/90
(58) Field of Search .................................... 384/107, 100, 384/115, 118, 119, 120; 310/90

(56) References Cited

U.S. PATENT DOCUMENTS

| 5,112,141 | 5/1992 | Asada et al. ........................ 384/100 |
| 5,358,339 | 10/1994 | Konno et al. ...................... 384/107 |
| 5,659,445 | 8/1997 | Yoshida et al. ................... 360/98.07 |
| 5,760,509 | 6/1998 | Chung ................................. 310/90 |
| 5,806,987 | 9/1998 | Nose et al. ......................... 384/100 |
| 5,886,854 | 3/1999 | Diaz et al. ....................... 360/99.08 |
| 6,020,664 | * 2/2000 | Liu et al. ..................... 384/107 X |
| 6,071,014 | * 6/2000 | Lee et al. ......................... 384/107 |

FOREIGN PATENT DOCUMENTS

| 8-210365 | 8/1996 | (JP) . |
| 10-267029 | 10/1998 | (JP) . |

* cited by examiner

Primary Examiner—Thomas R. Hannon
(74) Attorney, Agent, or Firm—Shinjyu Intellectual Property Firm

(57) ABSTRACT

A motor includes a stationary shaft and a rotatable rotor hub disposed about the stationary shaft. The rotor hub is adapted to support a magnetic storage disk such a hard disk. The motor includes thrust oil dynamic pressure bearings that axial support the rotor hub on the stationary shaft. The motor also includes radial gas-lubricated dynamic bearings that radially support the rotor hub on the stationary shaft. The thrust oil dynamic pressure bearings include electrically conductive fluid lubricant that provides a ground between the rotor hub and the stationary shaft thereby preventing undesirable discharges of electrostatic charges that may build up on the magnetic storage disk.

17 Claims, 9 Drawing Sheets

MOTOR HAVING A PLURALITY OF DYNAMIC PRESSURE BEARINGS

BACKGROUND OF THE INVENTION

1. Field of the Invention

The present invention relates to a motor for a disk drive device such as a hard disk drive. More specifically, the present invention relates to a motor having fluid lubricated dynamic bearings and gas-lubricated dynamic bearings for supporting relative rotation between a rotor and a shaft.

2. Description of the Related Part

Motors having dynamic bearings that make use of hydrodynamic pressure of a fluid lubricant are well known. Such motors include hydrodynamic bearings for supporting a sleeve member about a shaft using hydrodynamic pressure of the lubricant disposed therebetween.

One such motor is disclosed in Japanese Laid-Open patent publication Hei 8-210365. The disclosed motor includes a shaft and a sleeve member that include a pair of radial dynamic bearings and a pair of thrust dynamic bearings.

The pair of radial dynamic bearings provide support between the sleeve member and the shaft in the radial direction in a manner described below. Portions of an outer peripheral surface of the shaft radially face corresponding portions of an inner peripheral surface of the sleeve member with a small annular gap defined therebetween. The small annular gap is filled with lubricant. Dynamic pressure generation grooves are formed on either the portions of the outer peripheral surface of the shaft or on the portions of the inner peripheral surface of the sleeve member. The dynamic pressure generation grooves, the portions of the outer peripheral surface of the shaft, the portions of the inner peripheral surface of the sleeve member and the lubricant together define the pair of radial bearings. The dynamic pressure generation grooves generate dynamic pressure in the lubricant during rotation of the sleeve member relative to the shaft thereby providing stable radial support between the sleeve and shaft.

The pair of thrust dynamic bearing provide support between the sleeve member and the shaft in the axial direction in a manner described below. A thrust plate having a disk-like shaped is fixedly fitted to an portion of the shaft. Upper and lower surfaces of a thrust plate oppose adjacent surfaces of the sleeve member defining gaps therebetween. The gaps are filled with lubricant. Dynamic pressure generation grooves are formed on either the upper and lower surfaces of the thrust plate or on the adjacent surfaces of the sleeve. The dynamic pressure generation grooves, the upper and lower surfaces of the thrust plate, the adjacent surfaces of the sleeve, and the lubricant together define the pair of thrust bearings. The dynamic pressure generation grooves generate dynamic pressure in the lubricant during rotation of the sleeve member relative to the shaft thereby providing stable axial support between the sleeve and shaft.

When a motor having such dynamic pressure bearings with a lubricant rotates at a high speed, the lubricant tends to leak out of the bearings and may even leak out of the motor. As a result, there is a reduction of the dynamic pressure generated in the dynamic pressure bearings, which can make rotation of the sleeve member become unstable. In addition, the volume of the lubricant can change in response to changes in temperature. For instance, at elevated temperatures, the volume of most lubricants increases. Consequently, at elevated temperatures, lubricant leakage is more likely. Further, lubricants experience some change in viscosity in response to temperature changes. The rigidity of a bearing is likely to change as the viscosity of the lubricant changes.

In the thrust dynamic bearing, it is imperative that the shaft and the thrust plate be securely attached to one another and that the shaft be exactly perpendicular to the thrust plate. Otherwise, the rotational axis of the sleeve member may not correspond to a central axis of the shaft resulting in unwanted scraping contact between the thrust plate and the sleeve member.

In view of the above mentioned problems, motors are known that include gas-lubricated dynamic bearings. Gas-lubricated dynamic bearings utilizes air as a working fluid or lubricant. Therefore, leakage of lubricant is not a problem in a gas-lubricated dynamic bearing. Typically, a gas-lubricated dynamic bearing has a simple structure because a gas-lubricated dynamic bearing does not require a sealing structure for sealing lubricant. Also, the rigidity of a gas-lubricated dynamic bearing does not usually fluctuate in response to large changes in temperature.

However, when motors having gas-lubricated dynamic bearings are utilized in a hard disk drive device, such motors have the following problems.

For increasing memory capacity per unit area of a magnetic storage disk such as hard disk, disk drive devices have been employing a thin film magnetic head having superior magnetic characteristics or a magnetic head with an MR element (a magneto-resistive element) which responds to changes in the intensity of an adjacent magnetic field with corresponding changes in internal resistance. In this case, the MR element of the magnetic head has a thin film structure, portion of which have a generally high current density. Thus, a magnetic head with an MR element is sensitive to static electricity. However, when a disk such as a magnetic storage disk rotates in the air, electrostatic charges easily build up on the surface of the magnetic storage disk and rotary members. Therefore, when the MR element is used in a disk drive device, care must be taken to avoid discharges or grounding of electrostatic charge through the MR element of the magnetic head.

In a disk drive device having a spindle motor that utilizes gas-lubricated dynamic bearings, rotary members are supported on stationary members by means of gas pressure generated within the gas-lubricated dynamic bearings. The gas of the gas-lubricated dynamic bearing interposed between the sleeve member and the shaft member is not electrically conductive and therefore acts as an insulator. Therefore, electrostatic charges on the surface of the magnetic storage disk and the rotary members are not grounded through the rotary members to the stationary members of the spindle motor. As a result, the electrostatic charges cause problems such as a short-circuit or grounding between the surface of the magnetic storage disk and the magnetic head. Furthermore, the damping coefficient of the working fluid is not high in the gas-lubricated dynamic bearings of a spindle motor because the working fluid is the gas or air. As a result, when vibration occurs in the motor, the vibration lasts for a long period of time, which renders rotation of the spindle motor unstable.

SUMMARY OF THE INVENTION

One object of the present invention is to provide a motor that can maintain a stable rotation throughout its working life.

Another object of the present invention is to provide a motor that can maintain bearing rigidity in a wide range of temperature.

It is a related object of the present invention to provide a motor that can dampen vibrations and impact even when the motor stops rotating.

It is another related object of the present invention to provide a motor having gas-lubricated dynamic bearings with a means for avoiding damage to sensitive elements due to static electric charges that may build up on a magnetic storage disk.

It is still another related object of the present invention to provide a motor that can be simply assembled.

In accordance with one aspect of the present invention, a motor includes a stationary shaft and a rotor hub disposed about the stationary shaft, where the rotor hub is adapted to support a magnetic storage disk. A dynamic pressure bearing means is interposed between the stationary shaft and rotor hub for supporting relative rotation therebetween. The dynamic pressure bearing means includes thrust oil dynamic pressure bearings and radial gas-lubricated dynamic bearings. The thrust oil dynamic pressure bearings are adapted to support thrust loads of the rotor hub against the stationary shaft by increasing pressure of oil disposed between the stationary shaft and the rotor hub during rotation of the rotor hub. The radial gas-lubricated dynamic pressure bearing is adapted to support radial loads of the rotor hub against the stationary shaft by increasing pressure of air disposed between the stationary shaft and the rotor hub during rotation of the rotor hub.

The radial dynamic pressure bearings that support the rotor hub about the stationary shaft in the radial direction are gas-lubricated dynamic pressure bearings. Since no fluid leakage problem can occur in the radial gas-lubricated dynamic bearing, the motor is well suited for rotations at high speed. The motor can also maintain bearing rigidity within a wide range of temperatures.

On the other hand, the thrust dynamic pressure bearing that supports the rotor hub against the stationary shaft in the thrust direction is an oil dynamic pressure bearing. Since the oil disposed between the stationary shaft and the rotor hub has high damping coefficient, the motor can damp vibrations and impact through damping effect of the oil.

The thrust oil dynamic pressure bearings include electrically conductive fluid lubricant that provides a ground between the rotor hub and the stationary shaft thereby preventing undesirable discharges of electrostatic charges that may build up on the magnetic storage disk. Therefore, the present invention permits the use of more stable gas-lubricated dynamic bearings in a motor and yet overcomes the problems associated with the use of gas-lubricated dynamic bearings.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
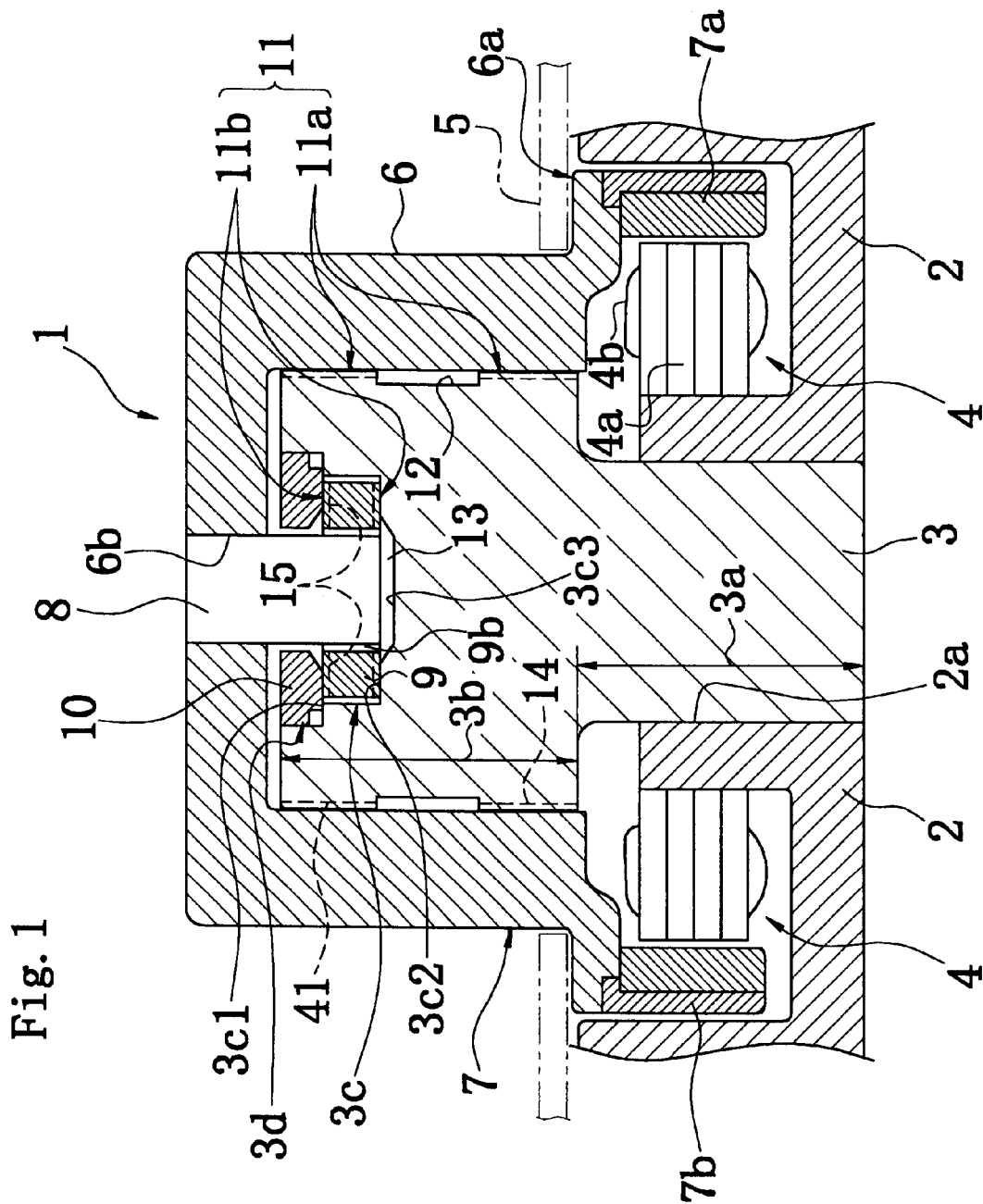
FIG. 1 is a fragmentary cross-sectional side view of a motor having a stationary shaft and a rotor hub in accordance with the present invention.

FIG. 1 shows a motor 1 having a base (motor bracket) 2 and a stationary shaft 3 fixedly fitted to the base 2. The base 2 has a cylindrical portion 2a in a middle portion thereof, and functions as a stationary member. The stationary shaft 3 includes a first portion 3a and a second portion 3b. The first portion 3a has a diameter that is smaller than the diameter of the second portion 3b. The first portion 3a and the second portion 3b are concentric. A lower end of the first portion 3a of the stationary shaft 3 is inserted in the central bore of the cylindrical portion 2a.

A rotor 7 is disposed about the second portion 3b of the stationary shaft 3 so as to rotate relative to the stationary shaft 3. The rotor 7 includes a rotor hub 6, a rotatable shaft 8, and a thrust plate 9. The rotor hub 6 includes a disk support surface 6a that supports a magnetic storage disk 5, such as hard disk, with a central bore of the disk 5 fitting the outer-periphery of the rotor hub 6. The rotatable shaft 8 is inserted into a central bore 6b of the rotor hub 6 and is thereby fixedly fitted to the rotor hub 6. The rotatable shaft 8 extends downward from the central bore 6b toward the base 2. The thrust plate 9 is a disk-shaped member fixedly fitted to the lower end of the rotatable shaft 8. Dynamic pressure bearing means 11 rotatably supports the rotor 7 on the stationary shaft 3, as is described in greater detail below.

As is shown in FIG. 1, the second portion 3b of the stationary shaft 3 has a larger diameter than the first portion 3a. The outer peripheral surface of the second portion 3b has an annular groove 12 formed on the axially central portion thereof. The upper portion of the second portion 3b is formed with a circular cavity that is concentric with the second portion 3b. The circular cavity includes a circular concave portions 3c and 3d which are concentric with the second portion 3b of the stationary shaft 3. The circular concave portion 3d includes a first stepped surface 3c1 and the circular concave portion 3c includes a second stepped surface 3c2.

A thrust cover 10 is fixedly fitted in the first stepped surface 3c1. A portion of the lower surface of the thrust cover 10 faces the upper surface of the thrust plate 9 with a small gap therebetween. The thrust cover 10 has an opening in the central portion thereof through which the rotatable shaft 8 extends. An annular gap is formed between the opening of the thrust cover 10 and the rotatable shaft 8. The second stepped surface 3c2 faces the lower surface of the thrust plate 9 with a small gap therebetween. A central portion of the second stepped surface 3c2 is formed with a circular concavity that includes a bottom surface 3c3. An air-filled space 13 is defined between the lower end of the rotatable shaft 8, the lower surface of the thrust plate 9 and the bottom surface 3c3.

A stator 4 is fixedly fitted to the base 2 as described below. The stator 4 includes a stator core 4a and a stator coil 4b. The stator core 4a is an annular member having radially extending portions (not shown) about which the stator coil 4b is wound and is carried on an outer peripheral surface of the cylindrical portion 2a of the base 2. The stator core 4a is disposed concentrically about the stationary shaft 3. The rotor 7 includes an annular rotor magnet 7a and an annular rotor yoke 7b. The rotor yoke 7b made of ferromagnetic material is fixedly fitted to a lower outward portion of the rotor hub 6 immediately beneath the disk support surface 6a. The annular rotor magnet 7a is fixedly fitted to an inner periphery of the cylindrical rotor yoke 7b around the stator core 4a. An annular gap is defined between the rotor magnet 7a and the stator core 4a. The stator 4 and the rotor magnet 7a encircle the first portion 3a of the stationary shaft 3. It should be understood that the rotor magnet 7a and the stator 4 are electrically excited to cause the rotor hub 6 to rotate about the stationary shaft 3. Further, the respective radiuses of the stator 4 and the rotor magnet 7a may be adjusted in order to change the rotary power characteristics of the motor.

Figure 3A:
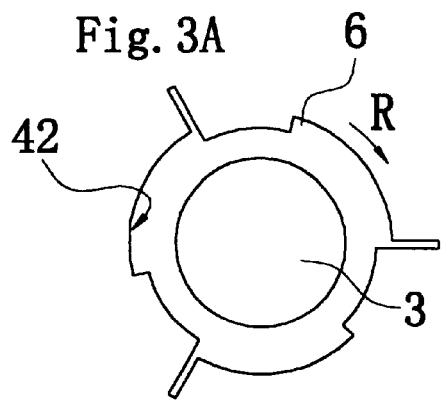
FIG. 3A is a schematic cross-sectional plan view of a gas-lubricated dynamic bearing having step grooves that serve as dynamic pressure generation grooves.
Figure 3C:
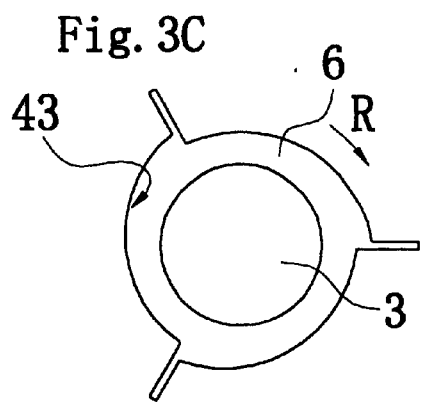
FIG. 3C is a schematic cross-sectional plan view of another configuration of a gas-lubricated dynamic bearing that may be used in the spindle motor of the present invention, the gas-lubricated dynamic bearing having tapered grooves as dynamic pressure generation grooves.
Figure 3B:
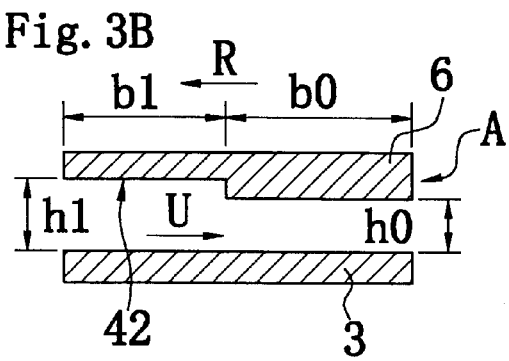
FIG. 3B is a schematic cross-sectional side view of the gas-lubricated dynamic bearing depicted in FIG. 3A, showing a gap formed between the outer peripheral surface of the stationary shaft and the inner peripheral surface of the rotor hub.
Figure 3D:
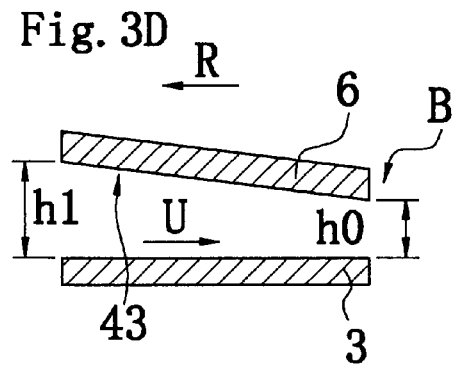
FIG. 3D is a schematic cross-sectional side view of the gas-lubricated dynamic bearing depicted in FIG. 3C, showing a gap formed between the outer peripheral surface of the fixed shaft and the inner peripheral surface of the rotor hub.
Figure 3E:
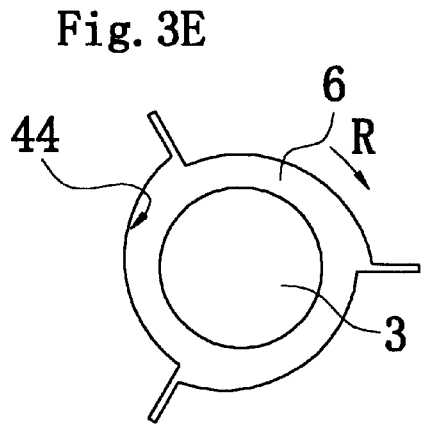
FIG. 3E is a schematic cross-sectional plan view of still another gas-lubricated dynamic bearing having tapered flat grooves as dynamic pressure generation grooves.
Figure 3G:
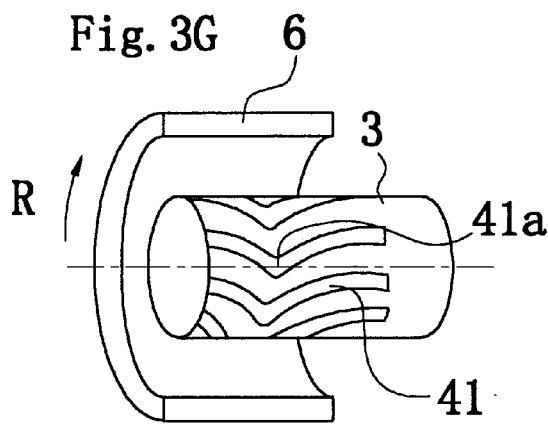
FIG. 3G is a schematic cross-sectional plan view of yet another gas-lubricated dynamic bearing having herringbone grooves as dynamic pressure generation grooves.
Figure 3F:
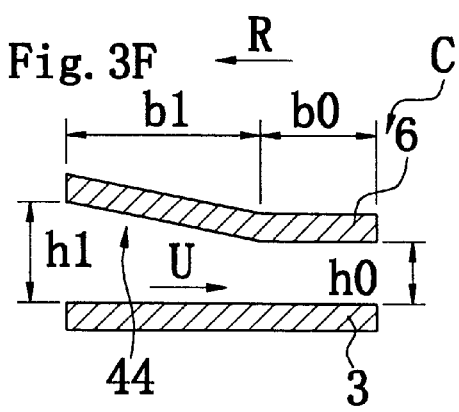
FIG. 3F is a schematic cross-sectional side view of the gas-lubricated dynamic bearing depicted in FIG. 3E, showing a gap formed between the outer peripheral surface of the stationary shaft and the inner peripheral surface of the rotor hub.
Figure 3H:
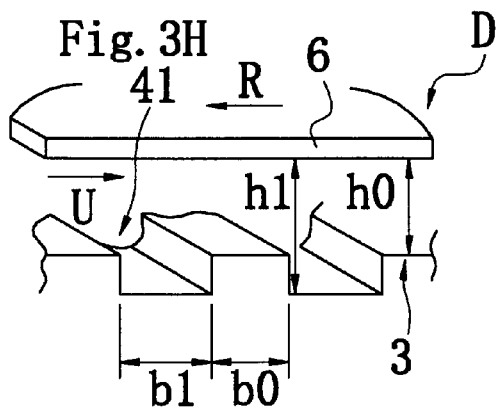
FIG. 3H is a schematic cross-sectional side view of the gas-lubricated dynamic bearings depicted in FIG. 3G, showing a gap formed between the outer peripheral surface of the fixed shaft and the inner peripheral surface of the rotor hub.

The dynamic pressure bearing means 11 includes a pair of radial gas-lubricated dynamic bearings 11a and a pair of thrust oil dynamic pressure bearings 11b. The pair of radial gas-lubricated dynamic bearings 11a are formed between the outer peripheral surface of the second portion 3b of the stationary shaft 3 and an inner peripheral surface of the rotor hub 6. The outer peripheral surface of the second portion 3b and the inner peripheral surface of the rotor hub 6 face each other with air therebetween. The air serves as a working fluid (lubricant). More specifically, the outer peripheral surface of the second portion 3b includes herringbone grooves 41 that serve as dynamic pressure generation grooves. Each of the herringbone grooves 41, as shown in FIGS. 3G and 3H, include two elongated portions that join at a central juncture 41a. It should be understood that only one of two sets of the herringbone grooves 41 are shown in FIG. 3G.

Figure 2:
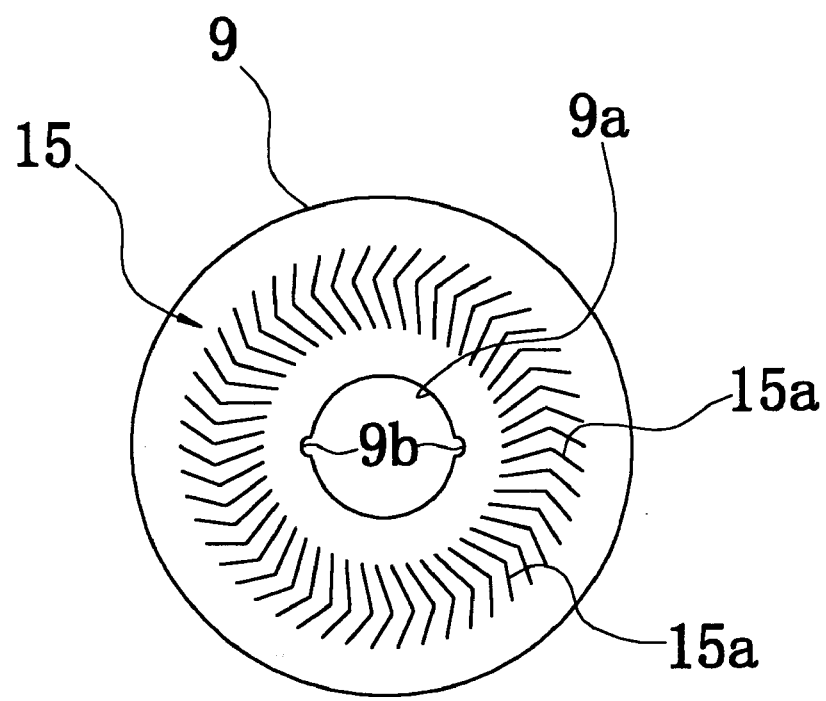
FIG. 2 is a plan view of a thrust plate removed from the stationary shaft of the motor depicted in FIG. 1, showing details of hydrodynamic grooves formed on the surface of the thrust plate.
Figure 5:
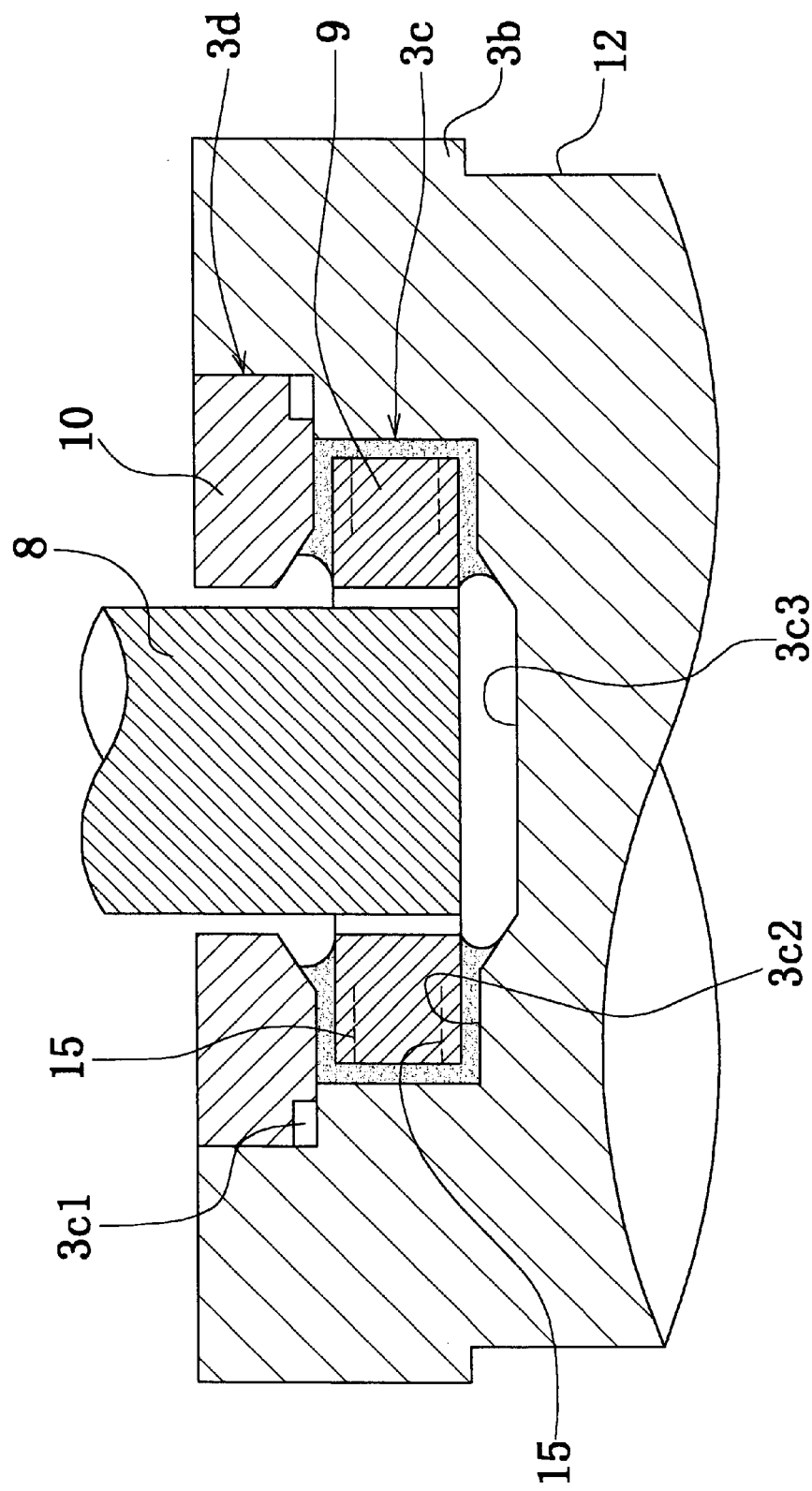
FIG. 5 is a fragmentary, cross-sectional view showing details of the thrust bearings of the motor depicted in FIG. 1.

The thrust oil dynamic pressure bearings 11b are formed between the lower surface of the thrust cover 10 and the upper surface of the thrust plate 9, and between the upper surface of the second stepped surface 3c2 and the lower surface of the thrust plate 9. The thrust oil dynamic pressure bearings 11b include electrically conductive oil such as magnetic fluid lubricant as a working fluid, and dynamic pressure generation grooves 15. As shown in FIGS. 1, 2 and 5, the upper and lower surfaces of the thrust plate 9 include dynamic pressure generation grooves 15 formed thereon.

An annular gap defined between the outer peripheral surface of the second portion 3b within the annular groove 12 and an adjacent portion of the inner peripheral surface of the rotor hub 6 has a radial width that is larger than an annular gap between the outer peripheral surface of the second portion 3b at the grooves 41 and an adjacent portion of the inner peripheral surface of the rotor hub 6. The annular groove 12 formed on the outer peripheral surface of the stationary shaft 3 interposes between the pair of radial gas-lubricated dynamic bearing 11a. As the motor 1 rotates, the herringbone grooves 41 generate radial load support pressure in the air between the outer peripheral surface of the second portion 3b and the inner peripheral surface of the rotor hub 6. The herringbone grooves 41 formed on the second portion 3b have a V-shape such that as the rotor hub 6 rotates about the stationary shaft 3, air pressure is generated along the herringbone grooves 41 such that the highest air pressure is generated at the juncture 41a of the herringbone grooves 41.

Thrust oil dynamic pressure bearings 11b are formed between the thrust plate 9 and the second stepped surface 3c2, and between the thrust cover 10 and the thrust plate 9. The herringbone grooves 15 of the thrust oil dynamic pressure bearing 11b generate thrust load support pressure in the oil retained therein during rotation of the motor 1.

Referring to FIG. 2, the thrust plate 9 includes V-shaped herringbone grooves 15 that serve as dynamic pressure generation grooves. As the motor 1 rotates, the working fluid moves from the edges of each of the herringbone grooves 15 towards the juncture 15a, thereby generating dynamic pressure. The thrust plate 9 is formed with a center bore 9a such that the lower end of the rotary shaft 8 is fixedly fitted to the center bore 9a. The inner peripheral portion of the center bore 9a includes two radially opposing semicircular openings that define air conduits 9b when the thrust plate 9 is fixedly fitted on the rotary shaft 8. The air-filled space 13 beneath the thrust plate 9 is connected to air interposed between the upper surface of the stationary shaft 3 and the lower surface of the rotor hub 6 through the air conduits 9b thereby maintaining equal air pressure on both sides of the thrust oil dynamic pressure bearing 11b.

As the coil 4b is electrically excited, the stator 4 and the rotor magnet 7a cause the rotor hub 6 to rotate about the stationary shaft 3. Consequently, the rotor hub 6 and the thrust plate 9, along with the magnetic storage disk 5 all rotate relative to the stationary shaft 3. The radial gas-lubricated dynamic bearing 11a and the thrust oil dynamic pressure bearings 11b support the rotor hub 6 and the thrust plate 9 during rotation. In the meantime, the air between the outer peripheral surface of the stationary shaft 3 and the inner peripheral surface of the rotor hub 6 moves from the edges of the herringbone grooves 41 towards the junctions 41a. In this manner, the radial gas-lubricated dynamic bearing 11a generates radial load support pressure. Similarly, the oil between the thrust plate 9 and the thrust cover 10, and between the thrust plate 9 and the second stepped surface 3c2 of the stationary shaft 3 moves toward the junctions 15a of the herringbone grooves 15, thereby generating thrust load support pressure. Since the radial gas-lubricated dynamic bearing 11a is divided in two portions by the annular groove 12 having an enlarged gap, there is less energy loss due to viscous resistance of the air during rotation of the rotor hub 6.

Unlike a fluid dynamic pressure bearing, the radial gas-lubricated dynamic bearing 11a utilizes air as a working fluid. Therefore, the radial gas-lubricated dynamic bearing 11a does not require a sealing structure for retaining lubricant. As a result, the radial gas-lubricated dynamic bearing 11a can have a simple structure. The radial gas-lubricated dynamic bearing 11a is suited for high-speed rotations because its working fluid does not leak out. The radial gas-lubricated dynamic bearing 11a can also maintain the radial rigidity in a wide range of temperature. Specifically, the rigidity of the radial gas-lubricated dynamic bearing 11a does not decrease at a high temperature. On the other hand, the thrust oil dynamic pressure bearing 11b utilizes oil as a working fluid. Since oil is more dense than air, the thrust oil dynamic pressure bearings 11b have higher rigidity. In this manner, the thrust bearings maintain durability and stability against wears due to sliding in the thrust bearings 11b. Each of the herringbone grooves 41 of the radial gas-lubricated dynamic bearing 11a is formed with two differing portions, each portion having a differing axial length such that the herringbone grooves 41 generate dynamic pressure towards the thrust oil dynamic pressure bearing 11b. Therefore, the air between the upper surface of the stationary shaft 3 and the lower surface of the rotor hub 6 maintains high pressure. In this manner, oil vaporizing from the oil of the thrust oil dynamic pressure bearing 11b does not escape outside the circular concave portion 3 through a gap between the outer peripheral surface of the rotary shaft 8 and the inner peripheral surface of the bore of the thrust cover 10. Further, if a boundary surface or meniscus between the oil of the thrust oil dynamic pressure bearing 11b and the air of the radial gas-lubricated dynamic pressure bearing 11a is formed perpendicular to the radial direction, the oil is sealed more securely during rotation due to centrifugal force applied to the oil. Therefore, there is no leakage of the oil. Still further, the oil of the thrust oil dynamic pressure bearing 11b has a high damping coefficient. Therefore, the thrust oil dynamic pressure bearings 11b are able to damp vibrations quickly. Still further, the thrust oil dynamic pressure bearings 11b utilize conductive oil as their working fluids. Therefore, the rotary elements, namely the rotor hub 6, the rotary shaft 8, and the thrust plate 9, and the fixed elements, namely the stationary shaft 3 and the thrust cover 10, are electrically connected via the electrically conductive oil in the thrust oil dynamic pressure bearings 11b. Therefore, even when electrostatic charge occurs on the magnetic storage disk 5 supported by the rotor hub 6, the electrostatic charge can be grounded from the rotary elements to the fixed elements via the conductive fluid. In this manner, the problems due to electrostatic charge are prevented.

Referring to FIG. 1, the thrust plate 9 is disposed within the circular concave portion 3c of the stationary shaft 3. The thrust cover 10 is disposed above the upper surface of the thrust plate 9 in the circular concave portion 3d. Since the rotor hub 6 is fixedly coupled to the thrust plate 9 via the rotary shaft 8, the rotor hub 6 is prevented from moving in the axial direction. In other words, the thrust plate 9 of the rotor hub 6 and the thrust cover 10 of the stationary shaft 3 prevent the rotary shaft 8 from slipping out of the rotor hub 6. Further, since the thrust plate 9 is disposed within the circular concave portion 3c of the stationary shaft 3 and is covered with the thrust cover 10, the oil in the thrust bearings 11b does not leak out even when the rotor 1 rotates at a high speed.

In the above described structure, since the second portion 3b of the stationary shaft 3 has a larger diameter than the first portion 3a, it is possible to form the thrust oil dynamic pressure bearings 11b within the second portion 3b. Further, the thrust oil dynamic pressure bearings 11b can secure ample space without sacrificing space for the radial gas-lubricated dynamic bearing 11a, as has been the case with a conventional motor. Also, since the thrust oil dynamic pressure bearings 11b are formed within the stationary shaft 3, the motor 1 can be made axially thin.

In the structure depicted in FIG. 1, the dynamic bearing means 11 is coupled to the second portion 3b of the stationary shaft 3, whereas the stator 4 and the rotor 7 are coupled to the first portion 3a of the stationary shaft 3. The respective radiuses of the radial gas-lubricated dynamic bearing 11a, the stator 4 and the rotor magnet 7a can be separately increased as desired. More specifically, a larger diameter of the radial gas-lubricated dynamic bearing 11a provides more stable axial support. By increasing the diameter of the stator 4 and the rotor magnet 7a, the stator 4 and the rotor magnet 7a can generate enough driving force and yet have a minimal axial thickness. If the stator and rotor magnet are axially thinner in a motor, then the radial gas-lubricated dynamic bearing 11a can be made greater in height along the stationary shaft 3, thereby providing more stable axial and radial support.

The dynamic pressure bearing means 11 can have improved wear resistance by manufacturing the rotor hub 6 and the thrust plate 9 with stainless steel, and the stationary shaft 3 made of a ceramic material. The surfaces of the rotor hub 6 and the thrust plate 9 which form the dynamic pressure bearing means 11 should be coated with molybdenum sulfide and then bake finished.

Figure 4:
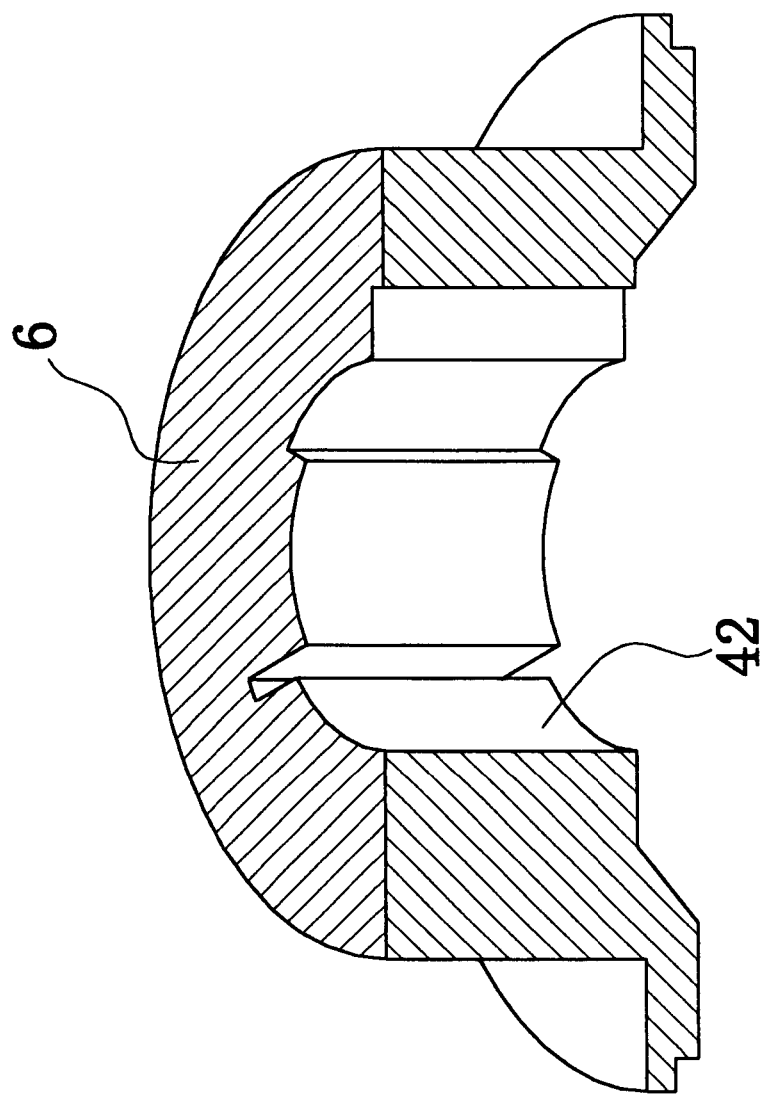
FIG. 4 is a perspective sectional view of a portion of the gas-lubricated dynamic bearing depicted in FIG. 3A.

In the above described embodiment, the dynamic pressure generation grooves 41 of the radial gas-lubricated dynamic bearing 11a are herringbone grooves 41 shown in FIGS. 3G and 3H. Alternatively, the dynamic pressure generation grooves 41 may be formed on the rotor hub 6. Further, the dynamic pressure generating grooves 41 may be block-type grooves such as step grooves 42 shown in FIGS. 3A, 3B and 4 formed on the rotor 6, taper grooves 43 shown in FIGS. 3C and 3D, and tapered flat grooves 44 shown in FIGS. 3E and 3F. FIGS. 3A through 3F are schematic views of block-type grooves. When the stationary shaft 3 and the rotor hub 6 rotate relative to one another at an angular speed v in the direction depicted as an arrow R, the air in the gaps h1 and h0 moves in the direction depicted by an arrow U due to viscous resistance from the relative rotation. In FIGS. 3A through 3H, the letters A, B, C and D denote schematic cross-sections of the inner peripheral surface of the rotor hub 6. The air flows from the wider gap h1 which has the length of b1 to the narrower gap h0 which has the length of b0. As a result, the air becomes compressed. In this manner, the air pressure increases thereby providing axial and radial support in the radial gas-lubricated dynamic bearing 11a.

Figure 6:
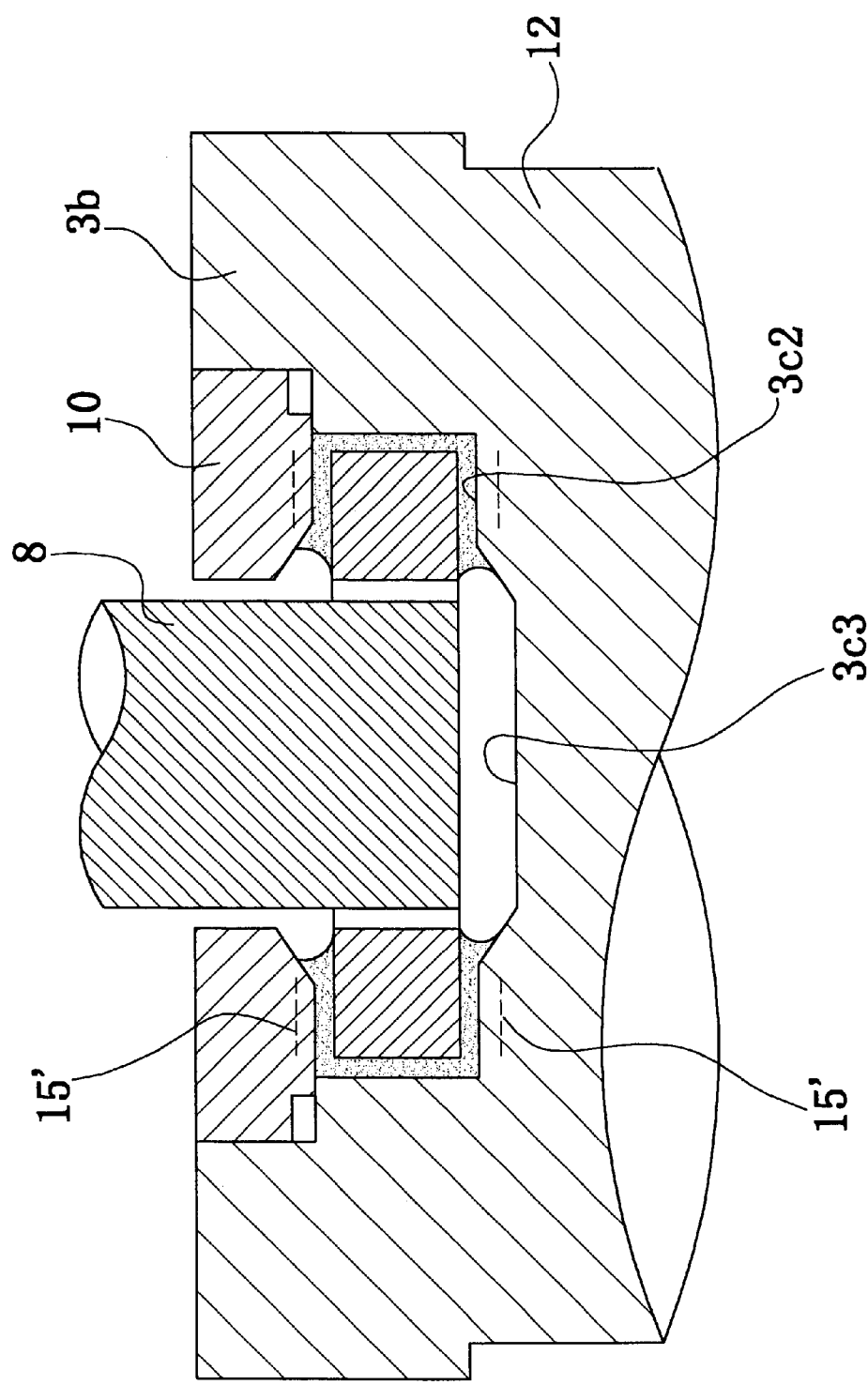
FIG. 6 is a fragmentary, cross-sectional view similar to FIG. 5, showing an alternate configuration of the thrust bearings of the motor depicted in FIG. 1.

As shown in FIG. 6, herringbone grooves 15' may alternatively be formed on the thrust cover 10 and the second stepped surface 3c2.

Second Embodiment

Figure 7:
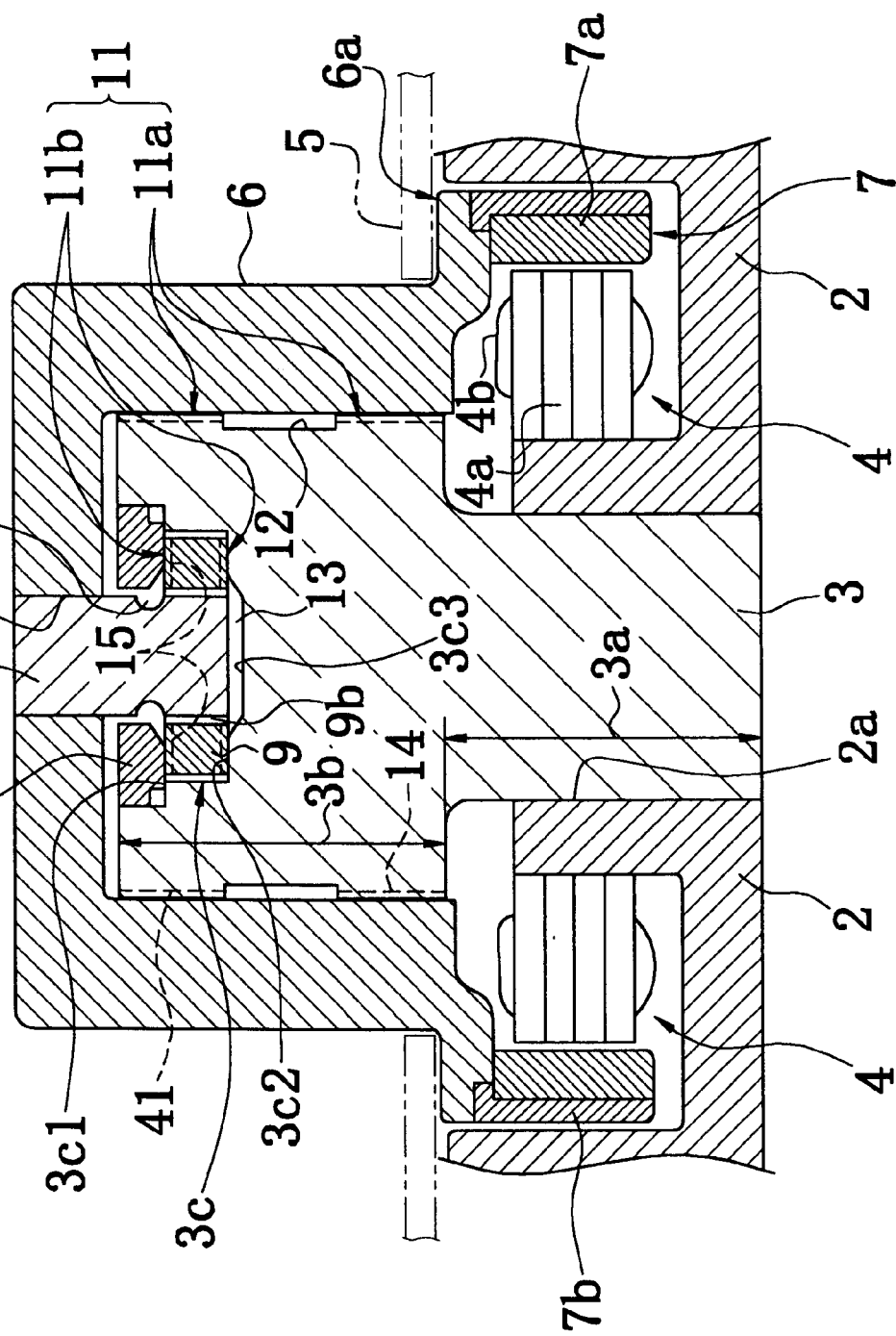
FIG. 7 is a fragmentary cross-sectional side view of a motor in accordance with another embodiment of the present invention.

Referring to FIG. 7, the rotary shaft 8'0 may alternatively be formed with a small groove 8a on the outer periphery thereof. The small groove 8a is located between the rotor hub 6 and the thrust plate 9. The small groove 8a is in the form of an annular groove that extends completely around the outer periphery of the rotary shaft 8'. The rotary shaft 8' is preferably made of aluminum or an aluminum alloy. The small groove 8a decreases the rigidity of the rotary shaft 8' and allows the rotary shaft 8' more readily deflect. Such a decrease in rigidity is advantageous during assembly of the motor.

Since the rotary shaft 8' may deflect about the groove 8a, the engagements between the rotary shaft 8' and rotor hub 6, and between the rotary shaft 8' and the thrust plate 9 are secure, but assembly of the motor is easier. For instance, even when the rotary shaft 8 is not exactly perpendicular to the thrust plate 9, the rotary shaft 8 deflects or bends at the groove 8a during rotation of the rotor hub 6 as a result of dynamic pressure generated at the thrust oil dynamic pressure bearings 11b. The dynamic pressure in the bearing 11b causes the shaft to bent at the groove 8a so that there is no imbalance during rotation of the rotor hub 6. In this manner, the rotor hub 6 and the thrust plate 9 become perpendicular to the rotary shaft 8. Consequently, rotational deviation of the rotor hub 6 due to imprecise assembly is prevented and the assembly of the motor 1 is simplified. The above described motor further prevents undesirable contact between the thrust plate 9 and the stationary shaft 3, and/or between the thrust plate 9 and the thrust cover 10, thereby preventing wear and abrasive contact therebetween.

Alternatively, the rotary shaft 8 may also be made of an elastic material such as conductive rubber and plastic to provide the flexibility of the rotary shaft 8'0 having the small groove 8a, as described above and depicted in FIG. 7.

Third Embodiment

Figure 8:
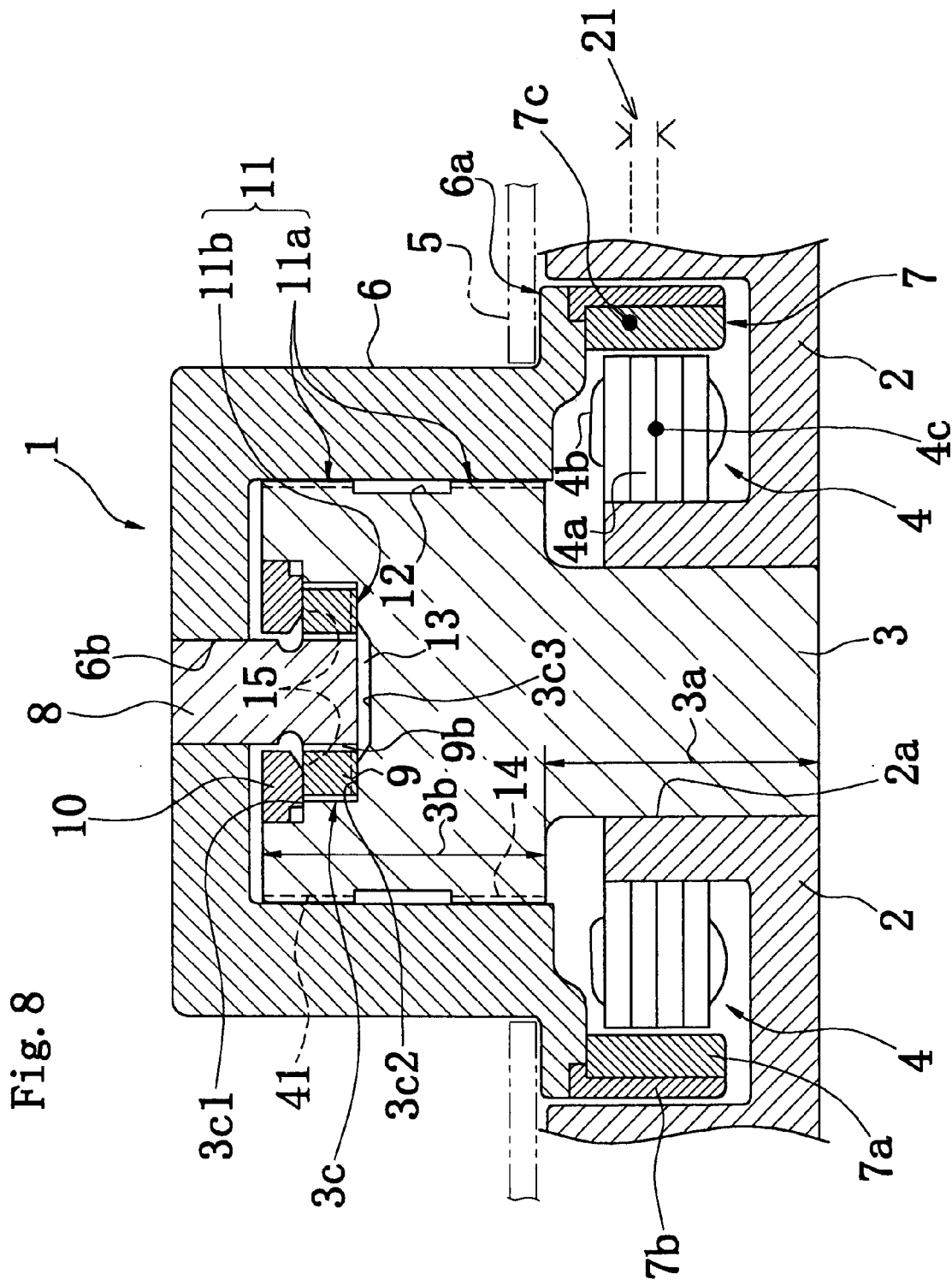
FIG. 8 is a fragmentary cross-sectional side view of a motor in accordance with another embodiment of the present invention.

A motor in accordance with the present invention may also alternatively be provided with a single thrust oil dynamic pressure bearing 11b between the lower surface of the thrust plate 9 and the stepped surface 3c2, as shown in FIG. 8. A second thrust bearing is provided by an axial offset 21 between the magnetic center 7c of the rotor magnet 7a and the magnetic center 4c of the stator 4. In the configuration depicted in FIG. 8, the thrust oil dynamic pressure bearing 11b creates hydrodynamic fluid pressure between the lower surface of the thrust plate 9 and the stepped surface 3c2 of the stationary shaft 3 thereby urging the rotor hub 6 upward. However, the axial offset 21 between the magnetic centers 7c and 4c urges the rotor hub 6 downward thereby balancing the hydrodynamic pressure generated in the single thrust oil dynamic pressure bearing 11b.

Alternatively, the offset 21 may be such that the magnetic center 7c is below the magnetic center 4c urging the rotor hub 6 upward, and, a single thrust oil dynamic pressure bearing 11b may be located between the upper surface of the thrust plate 9 and the lower surface of the thrust plate 20 (not depicted).

Figure 9:
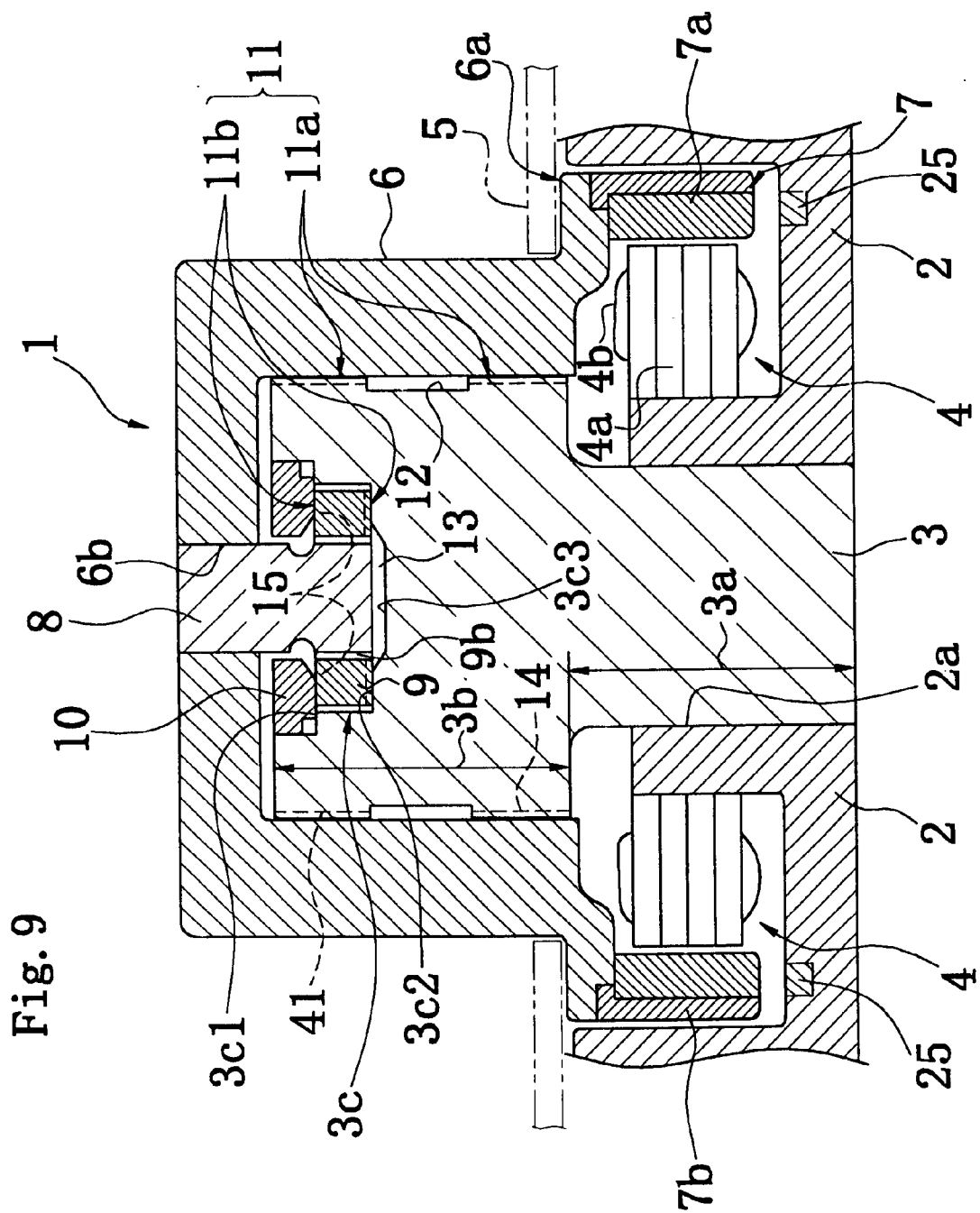
FIG. 9 is a fragmentary cross-sectional side view of a motor in accordance with still another embodiment of the present invention.

Also alternatively, as shown in FIG. 9, a single thrust oil dynamic pressure bearing 11b is provided between the lower surface of the thrust plate 9 and the stepped surface 3c2. A second thrust bearing is provided by the addition of a magnetic material 25 that provides a magnetic attracting force that interacts with, for instance, the rotor magnet 7a urging the rotor hub 6 downward to balance the upward force generated by the grooves in the thrust oil dynamic pressure bearing 11b.

Alternatively, the magnetic material 25 may be configured to create a repelling magnetic force with the rotor magnet 7a to urge the rotor hub 6 upward against downward force generated in a single thrust oil dynamic pressure bearing 11b between the upper surface of the thrust plate 9 and the lower surface of the thrust cover 10 (not shown).

The above described embodiments of the motor of the present invention are outer rotor type motors, in which the rotor magnet 7a is disposed in a radially outer periphery with respect to the stator 4. The present invention can also be applied to inner rotor motors, in which the rotor magnet 7a is disposed in a radially inner periphery with respect to the stator 4.

The motor 1 in accordance with the present invention having the aforementioned structure has following effects.

The radial dynamic pressure bearing that supports the rotor 7 against the stationary shaft 3 in the radial direction is a gas-lubricated dynamic bearing. On the other hand, the thrust dynamic pressure bearing that supports the rotor 7 against the stationary shaft 3 in the thrust direction is an oil dynamic pressure bearing. Since no fluid leakage problem occurs in the radial gas-lubricated dynamic bearing 11a, the motor 1 is suited for rotations at a high speed. The motor 1 can also maintain the rigidity of the bearings at a wide range of temperatures. In the first embodiment, the thrust oil dynamic pressure bearings 11b include oil between the thrust plate 9 and the stationary shaft 3, and between the thrust cover 10 and the thrust plate 9. Therefore, the motor 1 can damp vibrations through damping effect of the oil.

The radial gas-lubricated dynamic bearing 11a is formed on the outer peripheral surface of the second portion 3b of the stationary shaft 3. Since the second portion 3b has a diameter larger than the first portion 3a, the radial gas-lubricated dynamic bearing 11a has an area that is larger than prior art configurations that function as a bearing. Also, the larger radius of the second portion 3b means a faster rotation of the radial gas-lubricated dynamic bearing 11a with the same angular rotational speed of the motor 1. Therefore, the radial gas-lubricated dynamic bearing 11a can provide a greater axial support. Also, since the thrust oil dynamic pressure bearings 11b are formed within the stationary shaft 3, the thrust oil dynamic pressure bearings 11b do not increase the axial length of the motor 1.

The working fluid of the thrust oil dynamic pressure bearings 11b is electrically conductive oil such as magnetic fluid. Therefore, the stationary shaft 3 and the rotor 7 are electrically connected. In other words, electrostatic charges on the rotor 7 can be transmitted to the stationary shaft 3 via the electrically conductive oil. Consequently, the problems due to electrostatic discharge are prevented.

Further, in several embodiments described above the rotary shaft 8 (and shaft 8') is deflectable. Therefore, the engagements between the rotary shaft 8 and the rotor hub 6, and between the rotary shaft 8 and the thrust plate 9 do not need to be within as close a tolerance as might otherwise be required. Also, the rotary shaft 8 does not need to be strictly perpendicular to the rotor hub 6 and the thrust plate 9. Consequently, assembly of the motor can be simplified.

While only the above embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A motor comprising:
   a base member;
   a stationary shaft fixedly fitted to said base member;
   a cup-shaped rotor coupled to said stationary shaft; and
   a dynamic pressure bearing adapted to support said rotor against said stationary shaft, said dynamic pressure bearing including
      a radial gas-lubricated dynamic bearing adapted to support radial loads of said rotor against said stationary shaft by increasing pressure of air disposed between said stationary shaft and said rotor during rotation of said rotor, and
      a thrust oil dynamic pressure bearing adapted to support thrust loads of said rotor against said stationary shaft by increasing pressure of oil disposed between said stationary shaft and said rotor during rotation of said rotor.

2. A motor as set forth in claim 1, wherein
said thrust oil dynamic pressure bearing is disposed at a position axially adjacent to and radially inward from said radial gas-lubricated dynamic bearing.

3. A motor as set forth in claim 1, wherein:
said rotor includes a disk-shaped upper wall portion and a cylindrical portion, said upper wall portion axially facing an end surface of said stationary shaft and having a center to which a rotary shaft is fixedly fitted, said rotary shaft having a disk-shaped thrust plate coupled to an end thereof, said cylindrical portion extending downward from an outer peripheral portion of said upper wall portion and radially facing an outer peripheral surface of said stationary shaft;
said stationary shaft has a circular concave portion on said end surface thereof for receiving said thrust plate therein, and
a thrust cover fixedly fitted to an upper portion of said concave portion for covering said thrust plate, said thrust cover having a center bore, said rotary shaft extending therethrough.

4. A motor as set forth in claim 3, wherein:
said stationary shaft includes a first portion and a second portion, said second portion has an outer diameter larger that an outer diameter of said first portion, said second portion has said circular concave portion formed therein, said thrust oil dynamic pressure bearing is disposed and said first portion is fixedly fitted to said base member; and
said radial gas-lubricated dynamic bearing includes dynamic pressure generating grooves and said air, said air being disposed between said stationary shaft and said rotor, said dynamic pressure generating grooves formed on at least one of an outer peripheral surface of said second portion of said stationary shaft and an inner peripheral portion of said cylindrical portion of said rotor.

5. A motor as set forth in claim 3, wherein said dynamic pressure bearing includes two of said radial gas-lubricated dynamic bearings disposed one axially adjacent to another, and two of said thrust oil dynamic pressure bearings formed on both axial surfaces of said thrust plate.

6. A motor as set forth in claim 3, wherein:
said rotary shaft is made of an electrically conductive metal material; and
said rotary shaft includes a small annular groove between said upper wall portion and said thrust plate so as to be deflectable.

7. A motor as set forth in claim 3, wherein
said rotary shaft is made of a electrically conductive elastic material so as to be deflectable.

8. A motor as set forth in claim 3, wherein said thrust oil dynamic pressure bearing has dynamic pressure generation grooves, said oil being disposed in a first gap defined between a surface of said concave portion and said thrust plate, and said oil being disposed in a second gap between said thrust plate and said thrust cover;
said dynamic pressure generation grooves being formed on one of:
   axial upper and lower surfaces of said thrust plate, and
   a bottom surface of said concave portion and an axial bottom surface of said thrust cover; and
said bottom surface of said concave portion and said axial bottom surface of said thrust cover axially facing said axial lower and upper surfaces of said thrust plate, respectively.

9. A motor as set forth in claim 8, wherein:
an end surface of said rotary shaft and a portion of said bottom surface of said concave portion axially facing the end surface of said rotary shaft define an air-filled space, said air-filled space having an axial width that is larger than an axial width of said first gap in said thrust oil dynamic bearing; and
said thrust plate has an air conduit for communicating the air in said air-filled space to external atmosphere.

10. A motor as set forth in claim 8, wherein
said oil disposed in said thrust oil dynamic pressure bearing is electrically conductive.

11. A motor as set forth in claim 10, wherein
said electrically conductive oil is conductive magnetic fluid.

12. A motor comprising:
a stationary shaft including a first portion and a second portion larger in outer diameter than said first portion, said second portion being formed endwise with a circular cavity;
a rotor hub disposed about said stationary shaft, said rotor hub being adapted to support a magnetic storage disk, said stationary shaft and rotor hub including
   thrust oil dynamic pressure bearings disposed in said circular cavity for axially supporting said rotor hub on said stationary shaft, and
   radial gas-lubricated dynamic pressure bearings for radially supporting said rotor hub against said stationary shaft, said radial gas-lubricated dynamic pressure bearings having dynamic pressure generating grooves formed on at least one of said stationary shaft second portion on its outer peripheral surface and said rotor cylindrical portion on its inner periphery, and air present as a lubricant between said stationary shaft and said rotor; wherein
said thrust oil dynamic pressure bearings include electrically conductive oil lubricant for grounding said rotor hub to said stationary shaft for preventing undesirable discharge of electrostatic charge such as may build up on the magnetic storage disk.

13. A motor as set forth in claim 12, wherein said electrically conductive oil lubricant is an electrically conductive magnetic fluid.

14. A motor as set forth in claim 12, further comprising:
a rotary shaft fixedly fitted to said rotor hub and extending into said circular cavity; and a thrust plate fixedly fitted to said rotary shaft; wherein one of said thrust oil dynamic pressure bearings is at least partially defined by axially adjacent bottom surfaces of said thrust plate and said circular cavity between which an annular gap is formed, and includes lubricant in said annular gap;

said circular cavity includes an air-filled space formed between said rotary shaft endwise and an axially facing portion of the bottom surface of said circular cavity, said air-filled space being greater in axial extent than said annular gap in said one of said thrust oil dynamic bearings; and said thrust plate includes an air conduit for exposing air in said air-filled space to the external atmosphere.

15. A motor as set forth in claim 14, wherein:

said radial gas-lubricated dynamic pressure bearings comprise a pair disposed axially adjacent to one another; and said thrust oil dynamic pressure bearings comprise a pair formed on both axial surfaces of said thrust plate.

16. A motor as set forth in claim 14, wherein:

said rotary shaft is made of an electrically conductive metal material; and a small annular groove is formed circumferentially in said rotary shaft adjacent said thrust plate such that said rotary shaft is deflectable.

17. A motor as set forth in claim 14, wherein said rotary shaft is made of an electrically conductive elastic material such that said rotary shaft is deflectable.

* * * * *